United States Patent [19]
Tofte

[11] Patent Number: 4,458,609
[45] Date of Patent: Jul. 10, 1984

[54] METHOD AND APPARATUS FOR CONTROLLING AND MONITORING NH₃

[76] Inventor: David S. Tofte, P.O. Box 264, St. Clair, Minn. 56080

[21] Appl. No.: 355,138

[22] Filed: Mar. 5, 1982

[51] Int. Cl.³ .......................... A01C 23/02; F24H 1/40
[52] U.S. Cl. .......................... 111/7; 62/51; 126/378; 159/6.1; 222/318; 239/553.5
[58] Field of Search .......................... 111/1, 6, 7; 47/58; 222/318, 478, 608, 1; 62/51, 127, 525; 436/113; 239/469, 553.5; 137/561 A; 126/350 R, 378, 392; 159/6 R, 22–24

[56] References Cited

U.S. PATENT DOCUMENTS

| | | | |
|---|---|---|---|
| 1,599,081 | 9/1926 | Douglas . | |
| 2,007,251 | 7/1935 | Kniskern | 222/1 |
| 2,458,978 | 1/1949 | Chace | 222/76 |
| 2,557,955 | 6/1951 | Ewing | 111/6 X |
| 2,612,760 | 10/1952 | Baggette et al. | 111/7 |
| 2,691,358 | 10/1954 | Peck | 111/7 |
| 2,696,785 | 12/1954 | Blue | 111/7 X |
| 2,810,606 | 10/1957 | Taylor | 299/46 |
| 2,857,863 | 10/1958 | Jessen | 111/7 |
| 2,973,728 | 3/1961 | Garretson | 111/6 |
| 2,973,729 | 3/1961 | Peck | 111/7 |
| 3,017,057 | 1/1962 | Reed | 222/318 |
| 3,250,597 | 5/1966 | Mahl et al. | 47/58 X |
| 3,372,658 | 3/1968 | Ammann | 111/7 |
| 3,556,027 | 1/1971 | Ammann | 111/7 X |
| 3,905,523 | 9/1975 | Ahlers et al. | 222/504 |
| 3,990,432 | 11/1976 | Haynes et al. | 126/378 |
| 4,116,138 | 9/1978 | McFarland et al. | 111/7 |
| 4,341,168 | 7/1982 | Siebert | 111/7 |

OTHER PUBLICATIONS

Continental NH₃ Products Co., Inc., *Extra Flo.*

Primary Examiner—James R. Feyrer
Attorney, Agent, or Firm—Burd, Bartz & Gutenkauf

[57] ABSTRACT

A method and apparatus for controlling and monitoring the application rate of the anhydrous ammonia to the soil. A heat exchanger is used to maintain the anhydrous ammonia in a liquid state so that a flow control valve coupled to the heat exchanger can accurately control the rate of flow of liquid anhydrous ammonia to a manifold. Separate lines connected to the manifold distribute the liquid anhydrous ammonia to nozzles associated with earthworking tools to incorporate the ammonia into the soil. A portion of the ammonia from the manifold is directed back to an expansion chamber in the heat exchanger. The ammonia in the expansion chamber partially changes from a liquid to a vapor, thereby lowering the temperature of the ammonia in the expansion chamber and transferring heat from the liquid anhydrous ammonia in the heat exchanger to thereby maintain the ammonia in the liquid state. Lines carry the ammonia from the expansion chamber to nozzles associated with earthworking tools to incorporate the ammonia into the soil.

39 Claims, 9 Drawing Figures

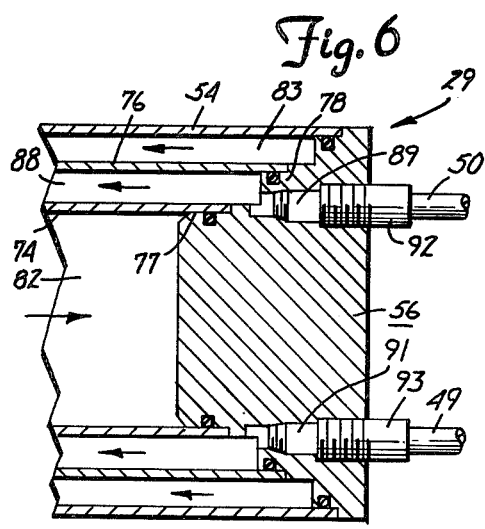
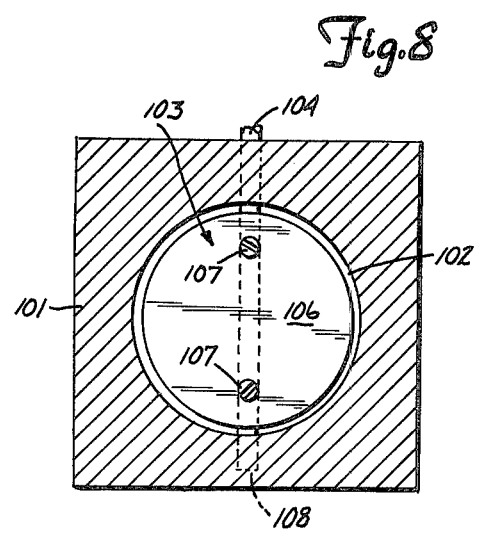
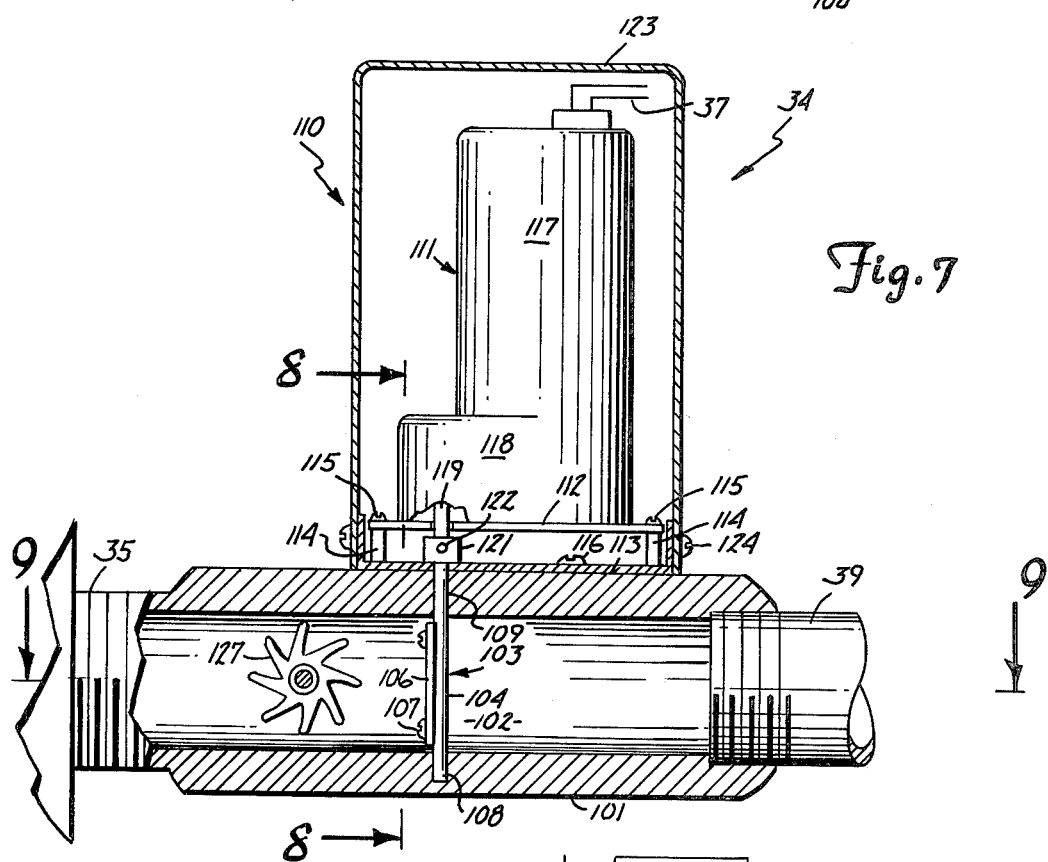
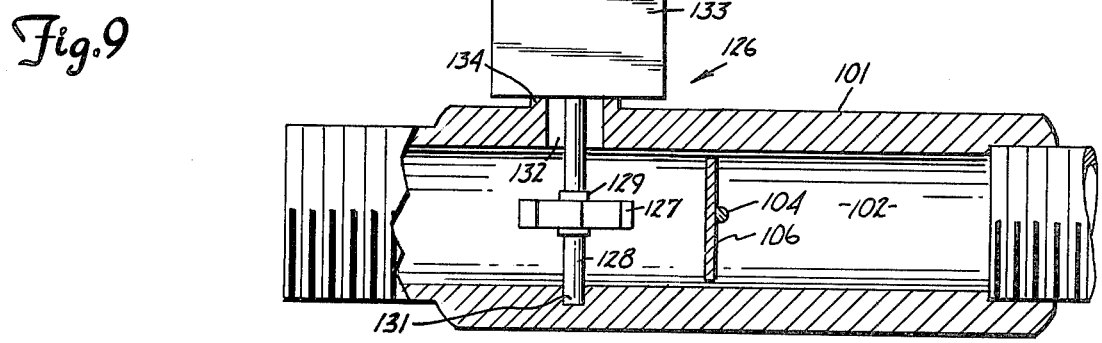

METHOD AND APPARATUS FOR CONTROLLING AND MONITORING NH₃

BACKGROUND OF INVENTION

Nitrogen is one of three essential chemicals needed for plant growth. Anhydrous ammonia, NH₃, contains a high percentage, 82% by weight, of nitrogen that is in available form for utilization by plants, as corn and the like. It is current agricultural practice to inject anhydrous ammonia into the soil with an implement having a plurality of knived injectors. Anhydrous ammonia being a liquid under pressure has a relatively low boiling point, making the NH₃ difficult to measure and control. In practice, the rate of application of NH₃ can vary up to 15% between the time the injection is started with a full anhydrous ammonia tank and the time the injection is completed. The variation in application rate is caused by temperature changes inside the tank as it is emptied. A second factor affecting the application rate of NH₃ is the ground speed of the implement. Varying soil conditions, field terrain, and types of tillage equipment all affect the towing vehicle's ability to maintain a constant ground speed. The combined temperature variations and ground speed variation can cause 20% to 40% error in injection application of NH₃. The lack of effective control and measurement of the application rate of NH₃ results in either an over-application or under-application of the NH₃ into the soil. This is an inefficient utilization of the NH₃ and can cause substantial reductions in crop yields.

SUMMARY OF INVENTION

The invention is directed to a method and apparatus for controlling the application of anhydrous ammonia into soil to compensate for the variables in temperature and ground speed of the vehicle towing the NH₃ injecting implement. The rate of flow of liquid anhydrous ammonia is controlled and monitored in a manner to achieve a desired ammonia soil incorporation rate. The NH₃ in the nurse or storage tank is in a liquid state under pressure at its boiling point. As liquid NH₃ is taken from the bottom of the tank, pressure drops caused by valves, couplers, and hoses produce vapor and reduce its temperature. When the NH₃ reaches the injector nozzles, there is considerable amount of vapor in the line. Conventional flow meter, regulators, and pumps do not have the ability to compensate for this vapor. The apparatus and method of the invention utilizes a heat exchanger operable to eliminate the vapor problem. The heat exchanger maintains the temperature of the NH₃ at a level whereby the NH₃ is a liquid. The liquid NH₃ is delivered to a flow control valve means having a flow meter valve operable to regulate the rate of flow of liquid NH₃. The liquid NH₃ flows to a manifold and through suitable hoses to injector nozzles with a minimum of drop in the pressure. This insures an accurate measurement of all of the NH₃ being applied without affecting the distribution characteristics of the applicator.

In addition to the accurate measurement of the liquid NH₃, it is important to control the amount of NH₃ being applied. The flow control valve means associated with the heat exchanger has a flow sensing means to sense the rate of flow of the liquid NH₃ through the flow control valve means. The sensing means produces signals which are utilized to produce an output signal providing the operator with a visual indication or data relative to the NH₃ application rate.

IN THE DRAWINGS

FIG. 6 is a sectional view taken along the line 6—6 of FIG. 4;

FIG. 7 is an enlarged longitudinal sectional view of the flow meter and flow control valve of FIG. 3;

FIG. 8 is a sectional view taken along the line 8—8 of FIG. 7; and

FIG. 9 is a sectional view taken along the line 9—9 of FIG. 7.

DESCRIPTION OF PREFERRED EMBODIMENT

Figure 1:
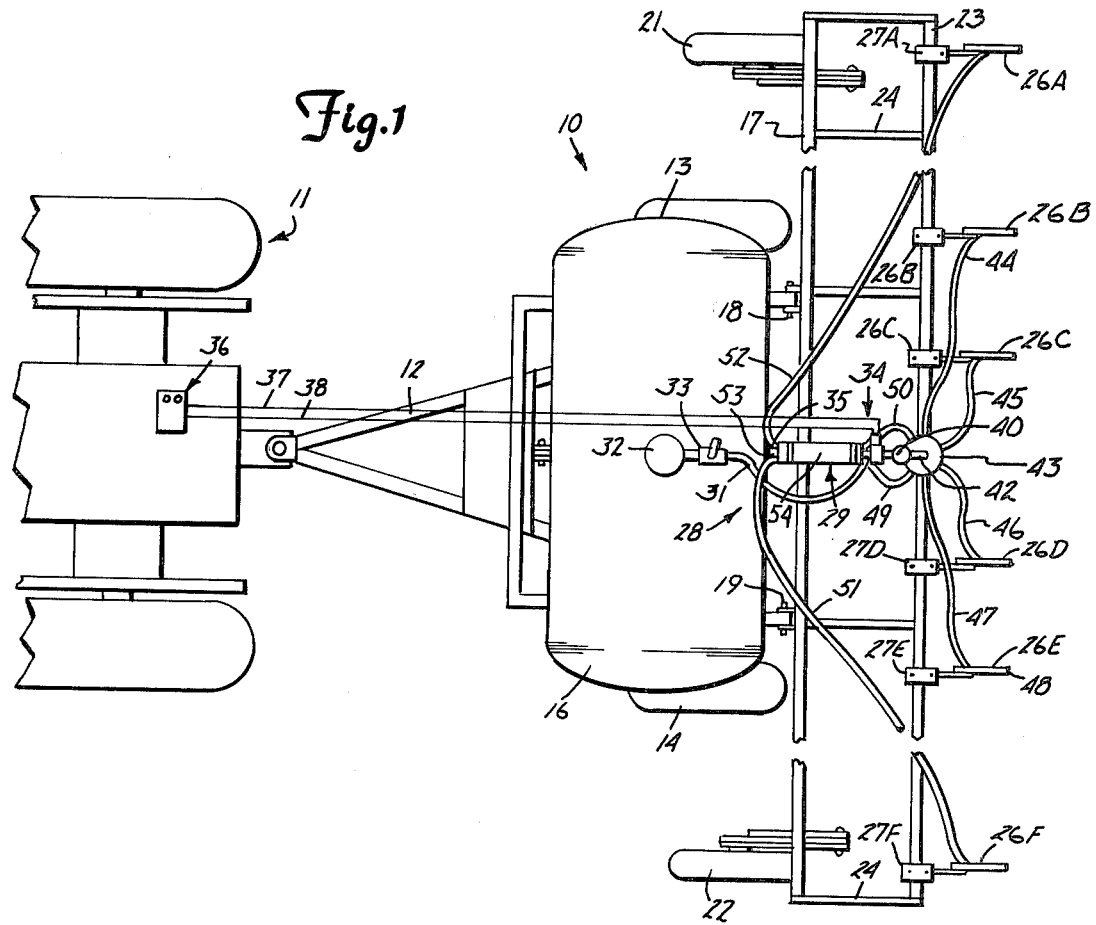
FIG. 1 is a plan view of an anhydrous ammonia fertilizer injecting implement equipped with the ammonia control and monitoring apparatus of the invention.

Referring to the drawing, there is shown in FIG. 1 a liquid fertilizer injecting implement indicated generally at 10 connected to a vehicle 11, such as an agricultural tractor. Implement 10 has a frame 12 supported above the ground with a pair of wheels 13 and 14. A large tank 16 accommodating liquid fertilizer, such as anhydrous ammonia, is mounted on frame 12. A transverse beam 17 is pivotally connected to the rear portions of frame 12 with a pair of pivot pins 18 and 19. Wheels 21 and 22 support the outer ends of beam 17 above the ground. A transverse tool bar 23 is located behind beam 17. A plurality of rearwardly directed arms 24 secure tool bar 23 to beam 17. A plurality of earthworking tools 26A–26F are laterally spaced along the length of the tool bar 23 and secured thereto with clamps 27A–27F. The earthworking tools 26A–26F each have a loop spring shank having a lower end connected to a knife adapted to cut into the soil. An example of implement 10 is shown in U.S. Pat. No. 3,608,645. Other types of liquid fertilizing injecting implements may be employed with the apparatus for controlling and measuring the application rate of anhydrous ammonia injected into the soil of the invention indicated generally at 28. Apparatus 28 is useable with all types of anhydrous ammonia applicators.

Figure 2:
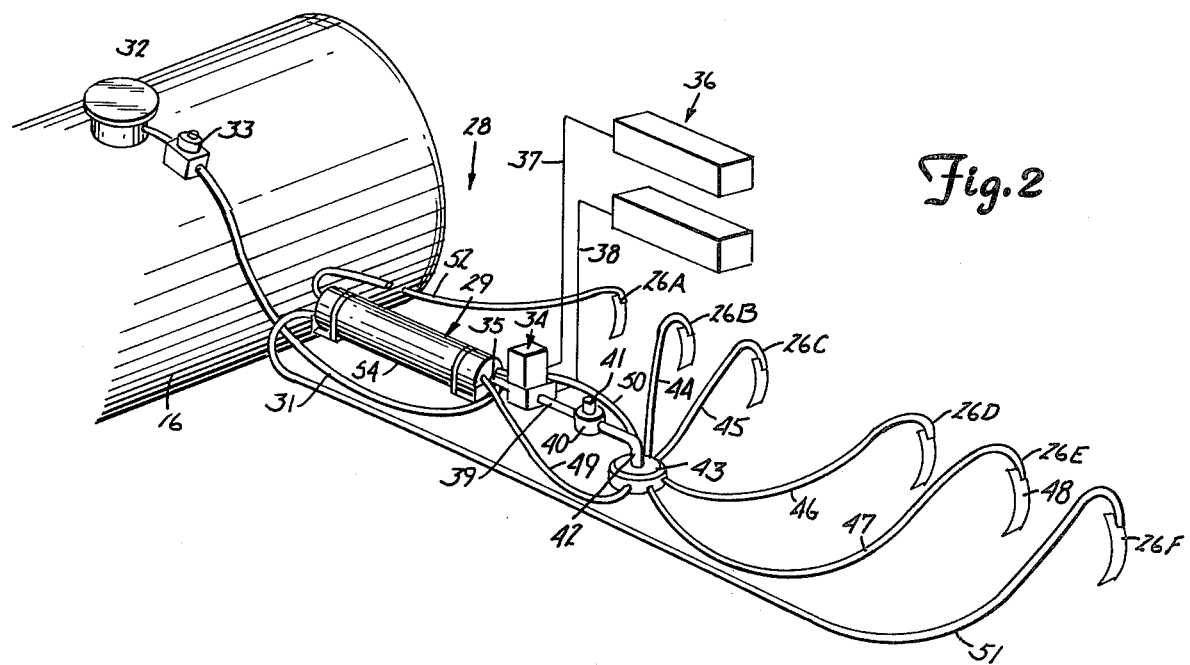
FIG. 2 is a perspective view of the anhydrous ammonia control and monitoring apparatus of the invention.
Figure 3:
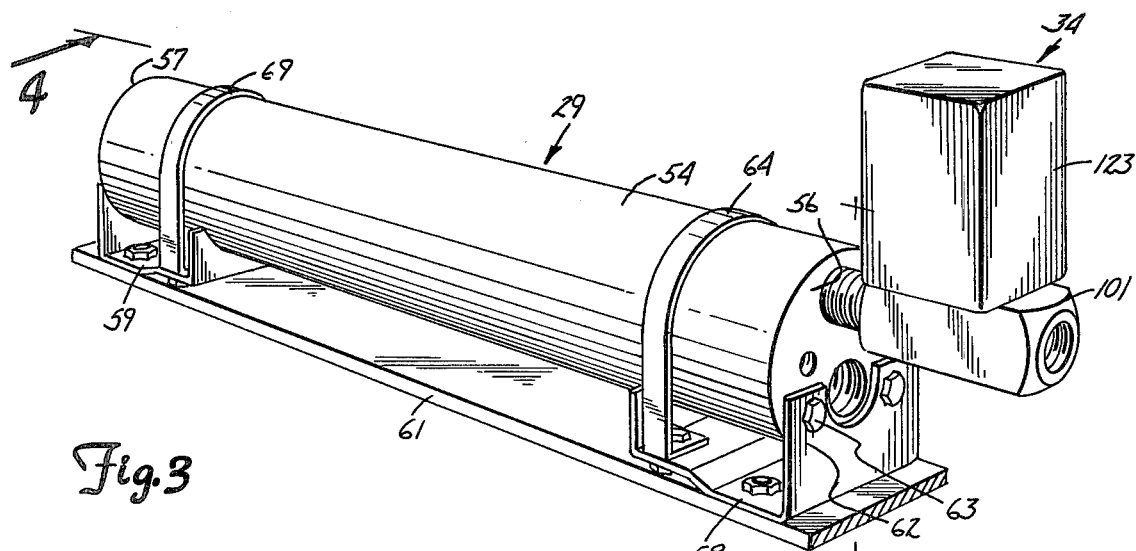
FIG. 3 is a perspective view of the heat exchanger and flow control valve of the apparatus of FIG. 2.

As shown in FIGS. 1 and 2, apparatus 28 includes a heat exchanger indicated generally at 29 connected to a liquid anhydrous ammonia carrying inlet hose 31. Hose 31 is joined to a cap 32 mounted on top of tank 16. The cap 32 is connected to a downwardly directed pipe (not shown) leading to the bottom of tank 16 so the pressurized liquid NH₃ will flow from tank 16 through hose 31, heat exchanger 29, control valve 34, manifold 43, and nozzle 48, which injects the NH₃ into the soil. A manually operated shut-off valve 33 is located in line 31 adjacent cap 32. Valve 33 has a manually operated lever which can be moved between open and closed positions to control the flow of liquid NH₃ in hose 31. When valve 33 is in the closed position, the flow of liquid NH₃ in hose 31 is stopped.

A flow control valve unit indicated generally at 34 is connected with a short nipple 35 to the outlet of heat exchanger 29. Valve unit 34 is operable to regulate the rate of flow of liquid NH₃ from heat exchanger 29 to a manifold 43. Valve unit 34 also functions to sense the rate of flow of liquid NH₃ flowing to manifold 43. A control console indicated generally at 36 mounted on tractor 11 is connected with electrical cable having lines 37 and 38 to flow valve unit 34. The control console 36 has an electrical circuit operable to provide visual data of the application rate of liquid NH₃. Console 36 has a manually operated on-off switch or servo-control 40 to control the operation of the flow control valve unit 34, as hereinafter described. The flow control valve unit can be automatically controlled with a micro-processor utilizing input data from the speed of the implement or towing vehicle and the sensed flow rate. The details of the automatic control console 36 and its functions are disclosed in co-pending application Ser. No. 405,323, filed Aug. 5, 1982. This application is incorporated herein by reference.

The liquid NH₃ flows from valve unit 34 through a pipe or hose 39 to a shut-off valve 40. Valve 40 has a solenoid 41 operably connected with lines to control console 36 which has suitable switches for controlling the operation of solenoid 41. The operator of vehicle 11 can operate the switch on console 36 to selectively open and close the shut-off valve 40. A pipe or hose 42 carries liquid NH₃ from valve 40 to a manifold 43. Manifold 43 is a cylindrical housing having a chamber that distributes the liquid NH₃ to a plurality of tubular lines or hoses 44, 45, 46, and 47, which extend to nozzles 48 attached to the backs of the lower ends of tools 26B, 26C, 26D, and 26E. A pair of tubular lines or hoses 49 and 50 are connected to opposite sides of manifold 43 and to the inlet end of heat exchanger 29. Lines 49 and 50 carry liquid NH₃ from manifold 43 to heat exchanger 29. This liquid NH₃ serves as a refrigerant to cool the primary liquid NH₃ flowing through the heat exchanger 29.

A second pair of tubular lines or hoses 51 and 52 lead from the outlet end of heat exchanger 29 to the nozzles on the lower ends of tools 26A and 26F. Lines 51 and 52 are connected to a T-coupling 53 secured to the outlet end of heat exchanger 29.

Heat exchanger 29, shown in FIGS. 3, 4, 5, and 6, has an elongated cylindrical casing 54 having opposite ends mounted on a first end member 56 and a second end member 57. Casing 54 is a cylindrical metal tube having a continuous cylindrical wall. Casing 54 is connected to a frame support 61 with a pair of mounts 58 and 59. Mount 58 has an end flange 62. A pair of bolts 63 secures flange 62 to end member 56. An inverted U-shaped band 64 extended over casing 54 is attached to mount 58 with a pair of nut and bolt assemblies 66. Second mount 59 has an upright end flange 67 attached with bolts (not shown) to end member 67. An inverted U-shaped band 69 extended over casing 54 is attached to mount 59 with a plurality of nut and bolt assemblies 73. Nut and bolt assemblies 72 and 73 secure mounts 58 and 59 to frame support 61.

Figure 4:
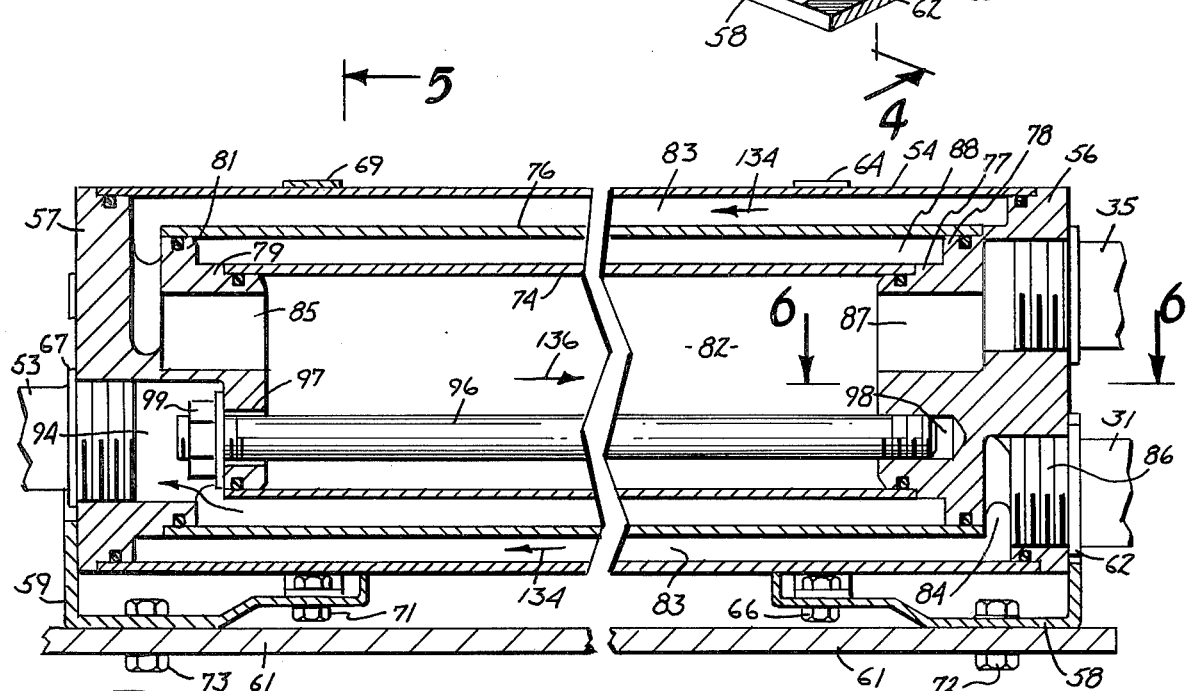
FIG. 4 is an enlarged sectional view taken along the line 4—4 of FIG. 3.
Figure 5:
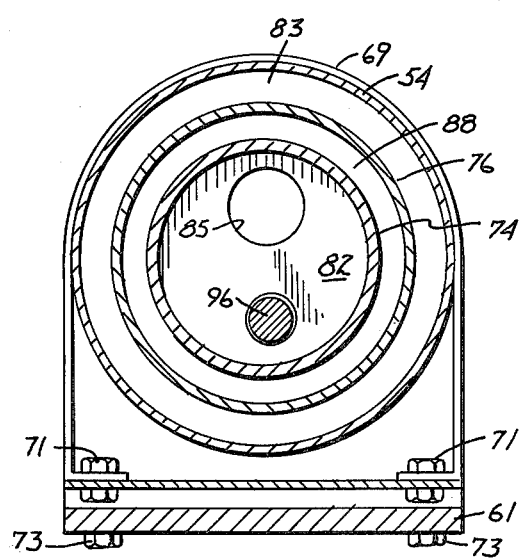
FIG. 5 is a sectional view taken along the line 5—5 of FIG. 4.

Referring to FIGS. 4 and 5, a pair of concentric inner and outer sleeves 74 and 76 are located within casing 54. Sleeves 74 and 76 have elongated cylindrical walls of heat conducting metal, such as aluminum. End member 56 has an inner annular stepped shoulder 77 accommodating the right end of the inner sleeve 74. End member 56 has a second or outer annular stepped shoulder 78 located radially outwardly of the shoulder 77 accommodating the right end of outer sleeve 77. Second end member 57 has an inner annular stepped shoulder 79 accommodating the left end of sleeve 74 and a second or outer annular shoulder 81 accommodating the left end of outer sleeve 76. Shoulders 77 and 79 support inner sleeve 74 concentrically with respect to casing 54 and define a central cylindrical passage 82. Shoulders 78 and 81 support outer sleeve 76 concentrically with respect to casing 54 and inner sleeve 74. Outer sleeve 76 is spaced radially inwardly from casing 54 and forms therewith a cylindrical passage 83. End member 56 has an inlet port 84 open to the right end of cylindrical passage 83. Port 84 has threads accommodating a nipple or connector 86 joined to the inlet hose 31. End member 57 has a transfer passage 85 that joins the left end of the cylindrical passage 83 to central passage 82. The liquid NH₃ flowing from hose 31 enters the right end of cylindrical passage 83 and flows the length of the passage 83, as shown by arrows 134, to transfer passage 85 open to the left end of central passage 82. The liquid NH₃ flows along the length of central passage 82, as shown by arrows 136, to an outlet port 87 accommodating nipple 35 joined to flow control valve unit 34.

Sleeves 74 and 76 are concentrically disposed with respect to each other and are radially spaced from each other to provide a cylindrical chamber 88 extended from end member 56 to end member 57. The inner surface of sleeve 74 forms the wall of central passage 82. The outer surface of sleeve 76 forms the inside wall of cylindrical passage 83. Sleeves 74 and 76 have large cylindrical surfaces that contact the liquid NH₃ flowing in passages 82 and 83. This permits an effective and efficient transfer of heat from the liquid NH₃ in passages 82 and 83 to the fluid in chamber 88.

Referring to FIG. 6, end member 56 has a pair of inlet ports 89 and 91 open to the right end of cylindrical chamber 88. A nipple 92 connected to hose 50 is threaded into port 89 to provide a passage from line 50 to chamber 88. A second nipple 83 is threaded into the port 91 to provide a passage from the line 49 to chamber 88.

Returning to FIG. 4, the end member 57 has a centrally located outlet port 94 accommodating T-coupling 53. Port 94 is open to the left end of chamber 88 to allow NH₃ to flow from chamber 88 into coupling 53 and lines 51 and 52 leading to the injector nozzles associated with the earthworking tools 26A and 26F. The NH₃ in chamber 88 is at low pressure as lines 51 and 52 are open at the nozzles to atmospheric pressure. This lowering of the pressure of the NH₃ causes the liquid NH₃ to change state to gaseous NH₃, causing a marked reduction in temperature of the fluid in chamber 88. This cools the NH₃ in passages 82 and 83, since there is heat transfer through sleeves 74 and 76.

End members 56 and 57 are held in operative clamping relation with respect to casing 54 and inner and outer sleeves 74 and 76 with an elongated rod 96 located in chamber 82. Rod 96 extends through a hole 97 in end member 57 and is threaded into a threaded bore 98 in end member 56. A nut 99 located in outlet port 94 and threaded on rod 96 holds the end members 56 and 57 in assembled relation with casing 54 and inner and outer sleeves 74 and 76.

Referring to FIGS. 7, 8, and 9, valve unit 34 has an elongated housing or body 101 having a linear passage 102. A butterfly valve 103 located in passage 102 is operable to control the rate of the flow of liquid NH₃ through passage 102. Butterfly valve 103 comprises a vertical shaft 104 supporting a circular disc 106. A plurality of screws 107 secure disc 106 to shaft 104. As shown in FIG. 8, disc 106 has an outer peripheral edge that is located in close relationship to the inside wall of passage 102 to restrict the flow of liquid NH₃ through passage 102. As shown in FIG. 9, shaft 104 and disc 106 can be rotated to an open position, as shown in dotted lines, to increase the rate of flow of liquid NH₃ through passage 102. The lower end of shaft 104 is located in a recess 108 in body 101. The upper end of shaft 104 extends through a hole 109 in body 101. A power control, indicated generally at 110, is operable to rotate shaft 104 and thereby adjust the position of disc 106 relative to passage 102.

As shown in FIG. 7, power control 110 includes a gear head motor 111 mounted on a platform 112. Platform 112 is positioned above a base 113 with a plurality of upright posts 114. The posts 114 accommodate bolts 115 that secure platform 112 to base 113. A plurality of bolts 116 secure the base to body 101. Gear head motor 111 has a reversible electric motor 117 and a gear box 118. Gear box 118 has a drive shaft 119 axially aligned with shaft 104. A collar 121 accommodating a set screw 122 drivably connects the drive shaft 119 to the upper end of the valve shaft 104 whereby, on operation of the electric motor 117, the gear box 118 functions to rotate valve shaft 104, thereby adjusting the valving position of disc 104 in passage 102. The gear head motor 111 is enclosed within a box-shaped cover 123. A plurality of screws 124 secure the cover 123 to base 113.

As shown in FIGS. 7 and 9, a liquid NH₃ flow sensor indicated generally at 126 is located upstream of the butterfly valve 103. Flow sensor 126 has a generally flat impeller 127 having outwardly directed curved fingers and one or more magnets, as shown in FIG. 7. The impeller 127 is rotatably mounted on a transverse shaft 128 with bearings 129. Shaft 128 has an end located in a recess 131 in body 101 and an end extended through a hole 132 in body 101. A sensor unit 133 is mounted on a lateral boss 134 of body 101. Sensor unit 133 is operable to sense the speed of rotation of the impeller 127. Impeller 127 has one or more magnets. Sensor unit 133 has a coil that produces an electrical current in response to rotation of the impeller magnets. This current is proportional to the rate of flow of liquid anhydrous ammonia in passage 102. Sensor unit 133 can be a Hall effect switch, which provides an electrical signal that is proportional to the speed of rotation of impeller 127. Sensor unit 133 can have a read switch operable with magnets in the impeller to control the flow of electrical current in a manner to indicate the rate of flow of liquid anhydrous ammonia in passage 102. Alternative sensing means, as an optical coupler and a variable reluctance, can be used in the sensor unit 133 to provide a signal proportional to the rate of flow of liquid anhydrous ammonia in passage 102. The signal from sensor unit 133 is transferred to line 137 to control console 36. Console 36 has an electrical circuit, including digital read-out components, which provides the operator with visual data of the rate of flow of liquid anhydrous ammonia through valve unit 34. The flow rate can be adjusted by operation of the manual servo-control 40, which controls the gear head motor 111 and the position of butterfly valve 103.

In use, anhydrous ammonia is pressurized in tank 16 to provide a source of liquid NH₃. The shut-off valve 33 is closed to confine the pressurized liquid NH₃ to tank 16. During the injection operation, shut-off valve 33 is opened to allow liquid NH₃ to flow via hose 31 into the inlet port 84 of heat exchanger 29. The liquid NH₃ flows through cylindrical passage 83 and into passage 82, in the direction of arrows 134, shown in FIG. 4. Liquid NH₃ flows in passage 83 to end member 57 and through transfer passage 87 into central passage 82. The liquid NH₃ flows in passage 82, as shown by arrows 136, to outlet port 87 to nipple 35 into flow valve unit 34. The flow of liquid anhydrous ammonia from port 84 to port 87 can be reversed. In other words, inlet hose 31 can be connected to port 87 and nipple 35 can be connected to port 84, whereby liquid anhydrous ammonia flows into central passage 82, through transfer passage 85, and cylindrical passage 83 to port 84. During the flow of liquid NH₃ through cylindrical passage 83 and central passage 82, it flows around the concentric sleeves 74 and 76. Chamber 88 functions as an expansion chamber for the NH₃ delivered to chamber 88 via the lines 49 and 50. The expansion of the NH₃ in chamber 88 is caused by the reduction of pressure of the NH₃. There is a partial change of the phase of the NH₃. Some of the liquid NH₃ is changed to vapor NH₃. The result is a lowering of the temperature of the NH₃. The walls of the sleeves 74 and 76, being of a heat conductive material, such as aluminum, transfer heat from liquid NH₃ in cylindrical passage 83 and central passage 82. This results in maintaining the liquid NH₃ in passages 82 and 83 below its boiling point. Ammonia from expansion chamber 88 flows through the T-coupling 53 and lines 51 and 52 to the nozzles associated with the earthworking tools 26A and 26F where it is introduced into the soil.

The rate of flow of liquid NH₃ from heat exchanger 29 is controlled by the flow valve unit 34. Butterfly valve 103 is angularly adjustable, as indicated in FIG. 9, to control the rate of flow of liquid NH₃ in passage 102. Gear head motor 111 is operable to change the position of the butterfly valve 103 and hold the butterfly valve 103 in an adjusted position. The control console 36 has manually actuated switch 40 that is operable to control the flow of electrical power to motor 117 and thereby operate the butterfly valve 103. The control console 36 can have automatic controls that are responsive to the ground speed of the tractor 11 and the sensed flow rate of liquid NH₃ flowing through the passage 102 to adjust the valve 103 so that the desired amount of NH₃ is injected into the ground. The impeller 127 rotates in response to the rate of flow of the liquid NH₃ in passage 102. The sensor 133 is responsive to the speed of rotation of impeller 126 to provide a signal that is transmitted to control console 36. This signal is used in conjunction with a ground speed signal and a memory circuit of a micro-processor to provide an output signal for controlling the gear head motor 111 thereby adjusting the position of butterfly valve 103.

While there is shown and described an apparatus and method for controlling the application of anhydrous ammonia of an ammonia applicator, it is understood that changes in the structure, materials, and arrangement of parts may be made by one skilled in the art without departing from the invention. The invention is defined in the following claims.

The embodiments of the invention in which an exclusive property or privilege is claimed are defined as follows:

1. An apparatus for use with an implement having means to incorporate anhydrous ammonia into the soil and a tank for storing liquid anhydrous ammonia to control the rate of application of anhydrous ammonia into the soil comprising: heat exchanger means having first passage means for carrying liquid anhydrous ammonia and second passage means separated from the first passage means for carrying anhydrous ammonia, line means connecting the heat exchanger means to the tank to provide a supply of liquid anhydrous ammonia to said first passage means, valve means connected to the heat exchanger to receive liquid anhydrous ammonia from the first passage means of the heat exchanger, said valve means having means to control the rate of flow of liquid anhydrous ammonia, first means to carry controlled flow of liquid anhydrous ammonia from the valve means to the means to incorporate said ammonia into the soil, second means connected to the first means for carrying part of said ammonia to said heat exchanger means and delivering said ammonia to the second passage means, said ammonia in said second passage means at least partially changing from a liquid to a vapor, thereby lowering the temperature of the ammonia in the second passage means and transferring heat from the ammonia in the first passage means to said ammonia in the second passage means so as to maintain the ammonia in the first passage means in a liquid state, and means to carry said ammonia from the second passage of the heat exchanger means to means to incorporate said ammonia into the soil.

2. The apparatus of claim 1 wherein: said heat exchanger means has an outer tubular casing and a pair of sleeves located within said casing, said sleeves being spaced from each other to form said second passage means, said first passage means being formed by the casing and said sleeves.

3. The apparatus of claim 1 wherein: said heat exchanger means has an outer tubular casing having first and second ends, a first end member mounted on the first end of the casing, a second end member mounted on the second end of the casing, first and second sleeves located within said casing, said second sleeve being spaced from the first sleeve to provide said second passage means, said casing and first and second sleeves providing said first passage means, and means securing the end members to the casing and first and second sleeves.

4. The apparatus of claim 3 wherein: said first passage means comprises a cylindrical passage located between the outer casing and the first sleeve and a central passage surrounded by the second sleeve, and said second end member having a transfer passage connecting the cylindrical passage with the central passage.

5. The apparatus of claim 4 wherein: said first end member has a first inlet port open to the cylindrical passage to allow the liquid anhydrous ammonia to flow into the cylindrical passage and a first outlet port open to the central passage whereby the liquid anhydrous ammonia flows through the cylindrical passage, transfer passage, and central passage, a second inlet port in the first end member open to the second passage means between the sleeves, a second outlet port in the second member open to the second passage means between the sleeves whereby anhydrous ammonia flows through the second passage means and heat is transferred from the ammonia in the first passage means to the ammonia in the second passage means, thereby cooling said ammonia in the first passage means.

6. The apparatus of claim 4 wherein: said means securing the end members to the casing includes a rod located in the central passage, and means securing the rod to the end members.

7. The apparatus of claim 3 wherein: the casing has an elongated cylindrical wall, said sleeves being cylindrical sleeves located concentrically with respect to said cylindrical wall.

8. The apparatus of claim 7 wherein: said first and second end members have annular shoulders, said sleeves having ends engageable with said annular shoulders to support the sleeves on the end members.

9. The apparatus of claim 8 wherein: said means securing the end members to the casing and sleeves include a rod located in the central passage, means securing the rod to the end members to hold the sleeves in engagement with said annular shoulders.

10. The apparatus of claim 1 including: shut-off valve means located in the line means connecting the heat exchanger means to the tank operable to cut off the supply of liquid anhydrous ammonia to said heat exchanger means.

11. The apparatus of claim 1 wherein: said first means to carry controlled flow of liquid anhydrous ammonia from the valve means includes a manifold, first line means connecting the manifold to said valve means for carrying the control flow of liquid anhydrous ammonia from the valve means to the manifold, and second line means connected to the manifold to carry liquid anhydrous ammonia to the means to incorporate said ammonia into the ground, said second means connected to the first means comprising second line means connected to the manifold and the heat exchanger means for carrying ammonia from the manifold means to said second passage means.

12. The apparatus of claim 11 including: shut-off valve means located in the line means connecting the valve means with the manifold, said shut-off valve means being operable to block the flow of liquid anhydrous ammonia from the valve means to the manifold.

13. The apparatus of claim 1 wherein: said means to control the rate of flow of liquid anhydrous ammonia in the valve means includes a butterfly valve, and means to adjust the position of the butterfly valve to change the rate of flow of liquid anhydrous ammonia through said valve means.

14. The apparatus of claim 13 wherein: said means to adjust the position of said butterfly valve means includes a gear head motor, and means operable to control the operation of said gear head motor.

15. The apparatus of claim 1 wherein: said valve means includes means to sense the flow rate of liquid anhydrous ammonia flowing through said valve means, and means to provide visual data as to the sensed flow rate of liquid anhydrous ammonia flowing through said valve means.

16. An apparatus for use with an implement having means to incorporate anhydrous ammonia into the soil and a tank for storing liquid anhydrous ammonia to control the rate of application of anhydrous ammonia into the soil comprising: heat exchanger means having first passage means for carrying liquid anhydrous ammonia and second passage means separated from the first passage means for carrying anhydrous ammonia, line means connecting the heat exchanger means to the tank to provide a supply of liquid anhydrous ammonia to said first passage means, first means to carry liquid anhydrous ammonia from the heat exchanger means to the means to incorporate said ammonia into the ground, second means connected to the first means for carrying part of said ammonia to said heat exchanger means and delivering said ammonia to the second passage means, said ammonia in said second passage means at least partially changing from a liquid to a vapor, thereby lowering the temperature of the ammonia in the second passage means and transferring heat from the ammonia in the first passage means to said ammonia in the second passage means so as to maintain the ammonia in the first passage means in a liquid state, and means to carry said ammonia from the second passage of the heat exchanger means to means to incorporate said ammonia into the soil.

17. The apparatus of claim 16 wherein: said heat exchanger means has an outer tubular casing and a pair of sleeves located within said casing, said sleeves being spaced from each other to form said second passage means, said first passage means being formed by the casing and said sleeves.

18. The apparatus of claim 16 wherein: said heat exchanger means has an outer tubular casing having first and second ends, a first end member mounted on the first end of the casing, a second end member mounted on the second end of the casing, first and second sleeves located within said casing, said second sleeve being spaced from the first sleeve to provide said second passage means, said casing and first and second sleeves providing said first passage means, and means securing the end members to the casing and first and second sleeves.

19. The apparatus of claim 18 wherein: said first passage means comprises a cylindrical passage located between the outer casing and the first sleeve and a central passage surrounded by the second sleeve, and said second end member having a transfer passage connecting the cylindrical passage with the central passage.

20. The apparatus of claim 19 wherein: said first end member has an inlet port open to the cylindrical passage to allow the liquid anhydrous ammonia to flow into the cylindrical passage and an outlet port open to the central passage whereby the liquid anhydrous ammonia flows through the cylindrical passage, transfer passage, and central passage, and a second inlet port in the first end member open to the second passage means between the sleeves and a second outlet port and the second member open to the second passage means between the sleeves whereby anhydrous ammonia flows through the second passage means and heat is transferred from the ammonia in the first passage means to the ammonia in the second passage means, thereby cooling said ammonia in the first passage means.

21. The apparatus of claim 19 wherein: said means securing the end members to the casing includes a rod located in the central passage, and means securing the rod to the end members.

22. The apparatus of claim 18 wherein: the casing has an elongated cylindrical wall, said sleeves being cylindrical sleeves located concentrically with respect to said cylindrical wall.

23. The apparatus of claim 22 wherein: said first and second end members have annular shoulders, said sleeves having ends engageable with said annular shoulders to support the sleeves on the end members.

24. The apparatus of claim 23 wherein: said means securing the end members to the casing and sleeves include a rod located in the central passage, means securing the rod to the end members to hold the sleeves in engagement with said annular shoulders.

25. The apparatus of claim 16 including: shut-off valve means located in the line means connecting the heat exchanger means to the tank operable to cut off the supply of liquid anhydrous ammonia to said heat exchanger means.

26. The apparatus of claim 16 wherein: said first means to carry liquid anhydrous ammonia from the heat exchanger means includes a manifold, first line means connected to the manifold for carrying liquid anhydrous ammonia to the manifold and second line means connected to the manifold to carry liquid anhydrous ammonia to the means to incorporate said ammonia into the ground, said second means connected to the first means comprising second line means connected to the manifold and the heat exchanger means for carrying ammonia from the manifold means to said second passage means.

27. The apparatus of claim 26 including: shut-off valve means located in the first line means connecting the valve means with the manifold, said shut-off valve means being operable to block the flow of liquid anhydrous ammonia from the heat exchanger means to the manifold.

28. A heat exchanger for cooling a first fluid with a second fluid having a temperature lower than the first fluid comprising: an outer tubular casing having first and second ends, a first end member mounted on the first end of the casing, a second end member mounted on the second end of the casing, a first sleeve, a second sleeve located within the first sleeve, said second sleeve being spaced from the first sleeve to provide a chamber between said first and second sleeves, said first and second sleeves being located within the casing to provide a cylindrical passage and a central passage, means securing the end members to the casing and first and second sleeves, said second end member having a transfer passage connecting the cylindrical passage with the central passage, said first end member having a first inlet port open to the cylindrical passage to allow the first fluid to flow into the cylindrical passage and an outlet port open to the central passage whereby the first fluid flows through the cylindrical passage, transfer passage, and central passage, and a second inlet port in the first end member open to the chamber between the sleeves and a second outlet port in the second end member open to the chamber whereby second fluid flows through the chamber and heat is transferred from the first fluid to the second fluid located in the cylindrical passage and central passage, thereby cooling said second fluid.

29. The heat exchanger of claim 28 wherein: said means securing the end members to the casing and sleeves includes a rod located in the central passage, and means securing the rod to the end members.

30. The heat exchanger of claim 28 wherein: the casing has an elongated cylindrical wall, said sleeves being cylindrical sleeves located concentrically with respect to said cylindrical wall.

31. The heat exchanger of claim 28 wherein: said first and second end members have annular shoulders, said sleeves having ends engageable with said annular shoulders to support the sleeves on the end members.

32. The heat exchanger of claim 31 wherein: said means securing the end members to the casing and sleeves include a rod located in the central passage, means securing the rod to the end members to hold the sleeves in engagement with said annular shoulders.

33. The heat exchanger of claim 28 wherein: said first fluid is liquid anhydrous ammonia and said second fluid is anhydrous ammonia, said second fluid in said chamber changing from a liquid phase to a vapor phase whereby the temperature thereof is reduced and the first fluid is cooled.

34. An apparatus for controlling and measuring the rate of flow of liquid anhydrous ammonia from a tank for storing liquid anhydrous ammonia to a desired location comprising: heat exchanger means having first passage means for carrying liquid anhydrous ammonia and second passage means separated from the first passage means for carrying anhydrous ammonia, said heat exchanger means having an outer tubular casing and sleeve means located within said casing, said sleeve means forming said second passage means, said first passage means being formed by the casing and said sleeve means, line means connecting the heat exchanger means to the tank to provide a supply of liquid anhydrous ammonia to said first passage means, valve means connected to the heat exchanger to receive liquid anhydrous ammonia from the first passage means of the heat exchanger, said valve means having means to control the rate of flow of liquid anhydrous ammonia and means to sense the rate of flow of liquid anhydrous ammonia from the heat exchanger, first means to carry controlled flow of liquid anhydrous ammonia from the valve means to the desired location, second means connected to the first means for carrying part of said ammonia to said heat exchanger means and delivering said ammonia to the second passage means, said ammonia in said second passage means at least partially changing from a liquid to a vapor, thereby lowering the temperature of the ammonia in the second passage means and transferring heat from the ammonia in the first passage means to said ammonia in the second passage means so as to maintain the ammonia in the first passage means in a liquid state, and means to carry said ammonia from the second passage of the heat exchanger means to a desired location.

35. The apparatus of claim 34 wherein: said outer tubular casing has first and second ends, a first end member mounted on the first end of the casing, a second end member mounted on the second end of the casing, said sleeve means located within said casing between said end members, and means securing the end members to the casing and sleeve means.

36. The apparatus of claim 35 wherein: said first passage means comprises a cylindrical passage located between the outer casing and the sleeve means and a central passage surrounded by the sleeve means, and said second end member having a transfer passage connecting the cylindrical passage with the central passage.

37. The apparatus of claim 34 wherein: said means to control the rate of flow of liquid anhydrous ammonia in the valve means includes a butterfly valve, and means to adjust the position of the butterfly valve to change the rate of flow of liquid anhydrous ammonia through said valve means.

38. The apparatus of claim 36 wherein: said means to adjust the position of said butterfly valve means includes a gear head motor, and means operable to control the operation of said gear head motor.

39. The apparatus of claim 34 including: means to provide visual data as to the sensed flow rate of liquid anhydrous ammonia flowing through said valve means.

* * * * *